OR 3,944,327

United States Patent
Larsen

[11] 3,944,327
[45] Mar. 16, 1976

[54] CONNECTION BETWEEN TWO LIGHT CONDUCTING GLASS FIBERS

[75] Inventor: Herbert Larsen, Munich, Germany

[73] Assignee: Siemens Aktiengesellschaft, Berlin & Munich, Germany

[22] Filed: May 9, 1974

[21] Appl. No.: 468,256

Related U.S. Application Data
[63] Continuation-in-part of Ser. No. 261,943, June 12, 1972, abandoned.

[30] Foreign Application Priority Data
July 14, 1971  Germany............................ 2135254

[52] U.S. Cl. ...... 350/96 C; 350/96 GN; 350/96 WG
[51] Int. Cl.² .......................................... G02B 5/14
[58] Field of Search .......... 350/96 R, 96 C, 96 WG, 350/96 GN

[56] References Cited
UNITED STATES PATENTS

| | | |
|---|---|---|
| 3,433,940 | 3/1969 | Baez et al...................... 350/96 B X |
| 3,455,625 | 7/1969 | Brumley et al................... 350/96 C |
| 3,779,628 | 12/1973 | Kapron et al. ................ 350/96 C X |
| 3,801,181 | 4/1974 | Kitano et al. .................... 350/96 R |
| 3,819,249 | 6/1974 | Borner et al. ................. 350/96 WG |
| 3,829,195 | 8/1974 | Rawson............................. 350/96 R |

*Primary Examiner*—David H. Rubin
*Attorney, Agent, or Firm*—Hill, Gross, Simpson, Van Santen, Steadman, Chiara & Simpson

[57] ABSTRACT

Connecting means for adjacent ends of core fibers. The core fibers are glass fibers drawn to have thin ends at one end, the thin end portion of which is coated with glass. The fibers uniformly increase in diameter in a generally conic conformation to thickened connecting points, where the fibers are connected in abutting engagement with each other. The thickened portions of the core fibers may be encased in a mass of synthetic resin, which may be machined along the peripheries of the thickened ends, to accommodate a centering ring to be pressed thereinto and hold the fibers in connected relation with respect to each other.

5 Claims, 3 Drawing Figures

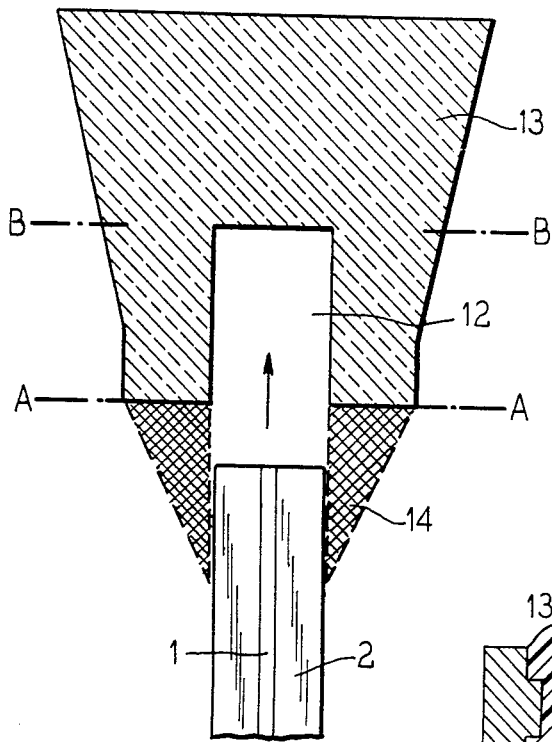
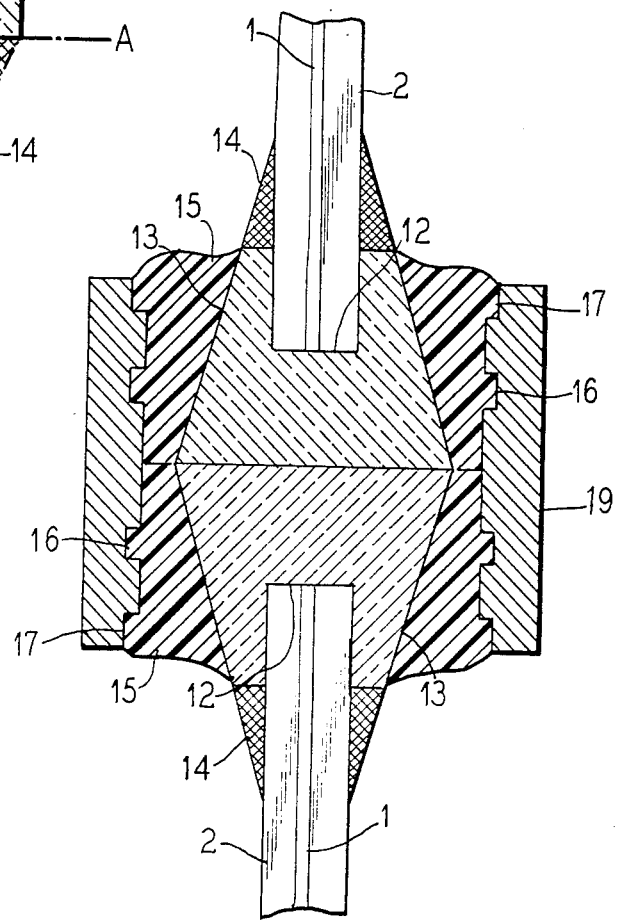

CONNECTION BETWEEN TWO LIGHT CONDUCTING GLASS FIBERS

This is a continuation-in-part application of my application Ser. No. 261,943, Filed June 12, 1972 and now abandoned.

FIELD OF THE INVENTION

Core glass fibers for the transmission of light, and connecting means, connecting the fibers in end-to-end relation.

BACKGROUND, SUMMARY AND OBJECTS OF INVENTION

Laser light received by a detector and modulated has heretofore been transmitted through glass fiber cables operated in a unimodal way. Such core fibers are especially well suited for the transmittal of communication due to the minimal transition time distortion. The glass fiber cables have been surrounded by coating glass and the core fiberglass diameter has been of the magnitude of the light wave length, and the coating diameter has been approximately forty times as large, giving a diameter of the entire system of approximately 80 to 100μm. Such a transmission system has been very satisfactory, but it has been difficult to connect two glass fibers in end-to-end relation or to connect the glass fibers between a laser as a transmitter and a detector as a receiver.

The present invention, therefore, is to create a simple and efficient connection between two core glass fibers, connecting the core fibers in end-to-end relation and attaining a low disturbance of the light expansion at the connecting point.

In order to solve this problem, I provide a light conductive glass fiber consisting of a core fiber and a coating glass arranged around the same and a second similar core fiber in which the ends of the first and second core fibers to be connected are thickened at their connection point, to attain an index of refraction profile which steadily declines from the middle to the peripheries of the fibers.

Preferably the core fibers are drawn to have thin ends increasing in diameters toward their connected ends to attain thickened core fiber ends of a diameter of from 0.5 to 5mm. This will reduce the index of refraction at the thickened ends of the core fibers in accordance with a parabolic function, from the middle towards the peripheries of the fibers.

In order to facilitate the connection between the two fiber ends, the thickened portions of the core fibers are imbedded in the mass, as for example, a synthetic resin, which may be machined to provide a fitting area for receiving a centering ring, holding the core fibers in end-to-end relation with respect thereto.

An object and advantage of the present invention, therefore, is to provide a simple and improved construction and arrangement of core fibers and connecting means therefor connecting the fibers to have a low disturbance of light expansion at the connecting point.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 2 is a diagrammatic sectional view taken through a glass component showing a core fiber coated with coating glass being inserted in the boring of the component and illustrating a modified form in which my invention may be embodied; and FIG. 3 is a diagrammatic sectional view showing components like those of FIG. 2 connected in end-to-end relation.

DESCRIPTION OF PREFERRED EMBODIMENTS OF INVENTION

Figure 1:
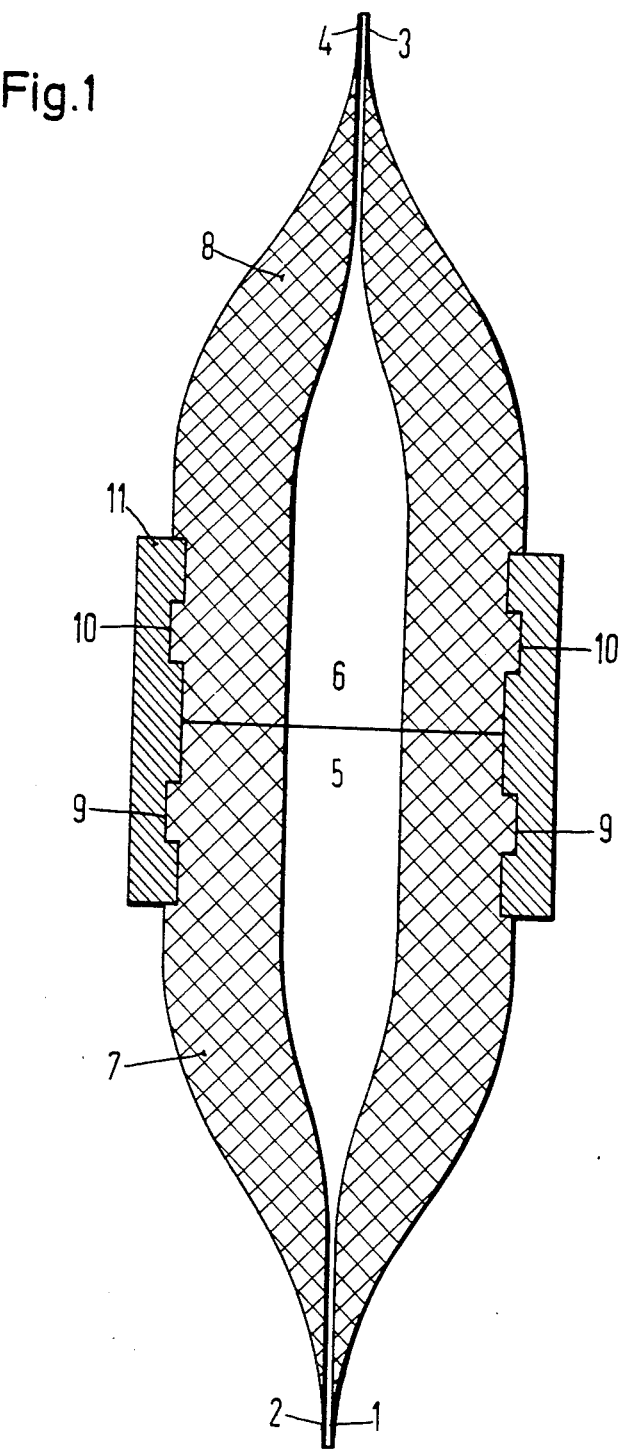
FIG. 1 is a sectional view taken through a core glass fiber connection schematically illustrating one form in which the core glass fiber connection may be attained.

In the embodiment of the invention illustrated in FIG. 1, I have shown two core fibers 1 and 3 connected in end-to-end relation with respect to each other in accordance with the principles of the present invention. As shown, the core fibers 1 and 3 have thin outer ends surrounded by coating glass 2 and 4, respectively, and are thickened toward their connected ends in a generally conic profile to approximately 1mm to provide sufficient bulk to the core fibers to simplify the handling and centering thereof and provide a refractive index which declines parabolically from the middle towards the peripheries of the fibers.

It should here be understood that the coating glass 2 and 4 terminates prior to thickening of the fibers. The thickened end portions 5 and 6 of the fibers are coated with a resin, which may be a casting resin and designated by reference numerals 7 and 8, respectively.

The casting resin 7 and 8 coating the thickened portions of the core fibers may be machined to provide annular centering ribs 9 and 10 with depressions on opposite sides thereof to enable a centering ring 11 to be pushed into engagement with said centering ribs when the core glass fibers are centered relative to each other and with the ends 5 and 6 of the core glass fibers in abutting engagement with each other.

The thinning of the core fibers 1 and 3 can be achieved by a drawing process in a suitable manner known to those silled in the art and to provide a refractive index profile in the thickened end areas 5 and 6 changed by an ionic exchange diffusion to receive the desired parabolic decline of the refractive index.

It should further be understood that when imbedding the fibers with the casting resin, they may be centered by means of an incident beam, and that this centering and machining of the casting resin and the connection of the centering ring thereto, attains a centering exactness between the core fibers at the connecting points thereof, which could not be possible by a direct connection of the unthickened fibers.

In the embodiment of the invention illustrated in FIG. 2, I have diagrammatically shown a core fiber 1 surrounded with coating glass 2 in position to be inserted in a recess 12 of a glass component 13, which recess may be a boring in said component. The glass fiber may be connected with a second glass fiber or with a terminal end device, without the glass component 13. The terminal end device may be an optical transmitting device or an optical amplifier. The core fiber 1 together with the coating glass 2 may then be inserted in a boring 12 of the component 13 and fixed thereto by means of a glue ring 14.

The component 13 has the same index of refraction in the area between A—A and B—B as the index of the refraction of the coating glass and the refractive index from the middle towards the periphery in the end surface of the core fiber steadily declines.

In FIG. 3 of the drawings, I have shown a connection of two glass fibers 1 like the glass fibers of FIG. 2. The glass fibers 1 are surrounded with coating glass 2 in position to be inserted in recesses 12 of glass components 13 arranged in abutting relation with respect to each other. The glass components 13 are surrounded with a resin 15 that may be machined to provide centering ribs 16 and 17 when the glass components 13 and core glass fibers are centered relative to each other. A centering ring 19 then is pushed into engagement with the centering ribs when the components 13 are centered relative to each other, to retain the components 13 and core glass fibers 1 in centered axial alignment with each other. Like the form of the invention illustrated in FIG. 2, the core glass fibers and coating glass are fixed in position in the recesses 12 by means of glue rings 14.

I claim as my invention:

1. A connecting means for glass fibers comprising,
    a first core glass fiber,
    a second core glass fiber,
    coating glass surrounding each core glass fiber and forming a sheath therefor,
    a conical glass component part for each glass fiber having a recess in the small diameter end of said conical glass component part for receiving the core glass fiber and coating glass to extend generally along the axis of said conical glass component part, each conical glass component part having a refractive index profile in which the periphery of the recess radially to the outer surface of the conical glass component part has the same refractive index as the coating glass forming a sheath for the core glass fiber, and the region of the conical glass component part extending from the inner end of the recess to the large diameter end of the conical glass component part has the same refractive index extending in an axial direction as the core glass fiber, and slopes constantly down in all directions toward the conical sheathing surface of the conical glass component part,
    a mass of machinable material surrounding each conical glass component part, and
    a centering ring surrounding the mass and retaining the conical glass components parts in end-to-end relation with respect to each other.

2. The connecting means of claim 1, in which adhesive rings extend about the bore openings and retain the core fibers of the recesses.

3. The connecting means of claim 2, in which the enlarged front end surfaces of the conical glass component parts have a maximum diameter of 0.5 to 5mm.

4. The connection of claim 1, wherein the mass of machinable material has a fitting area machined on its surface and the centering ring pressed into engagement with the machined area is provided to connect the two core fibers in end-to-end relation with respect to each other.

5. The connection of claim 1, wherein the mass is the synthetic resin.

* * * * *